Patented June 24, 1924.

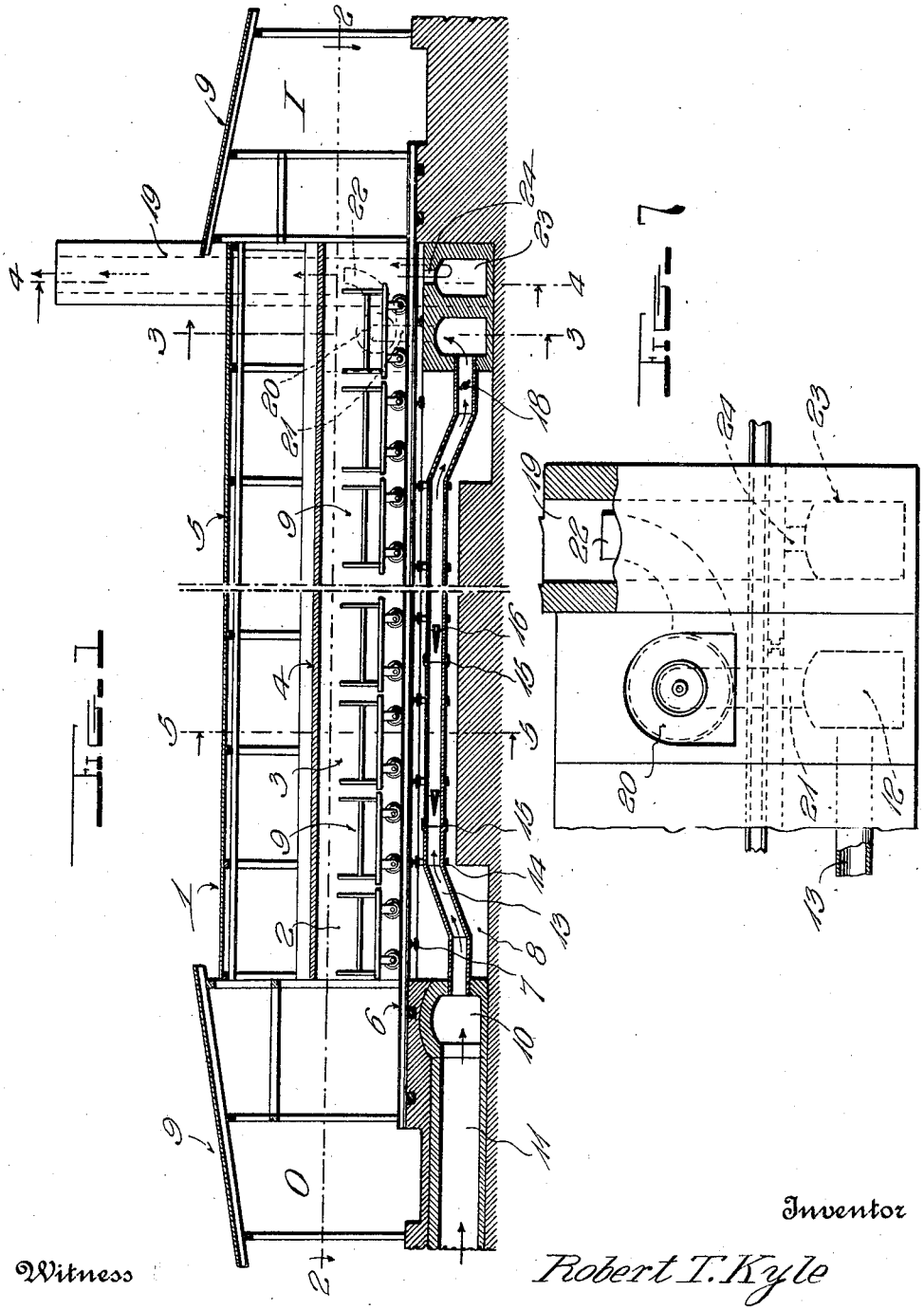

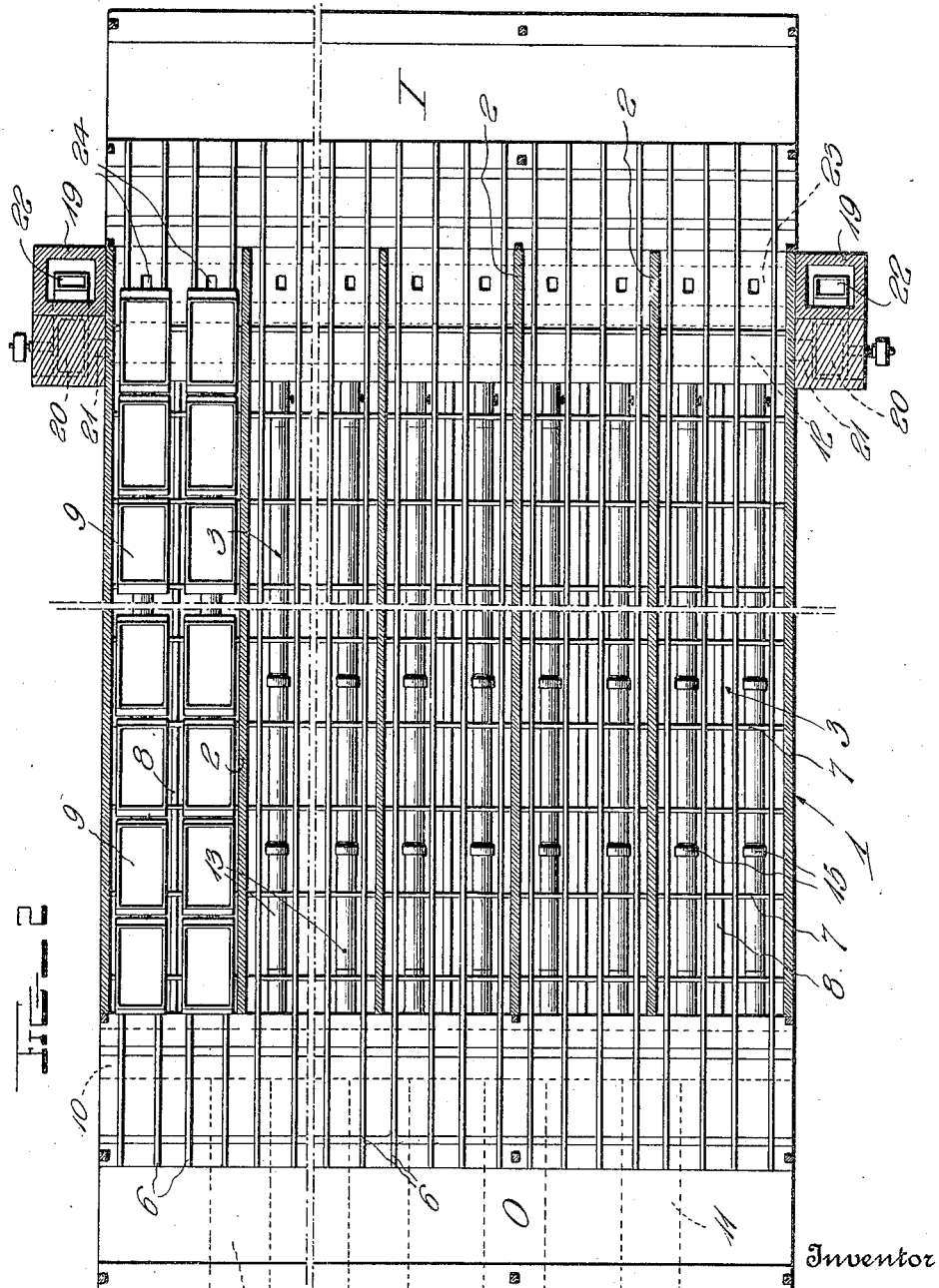

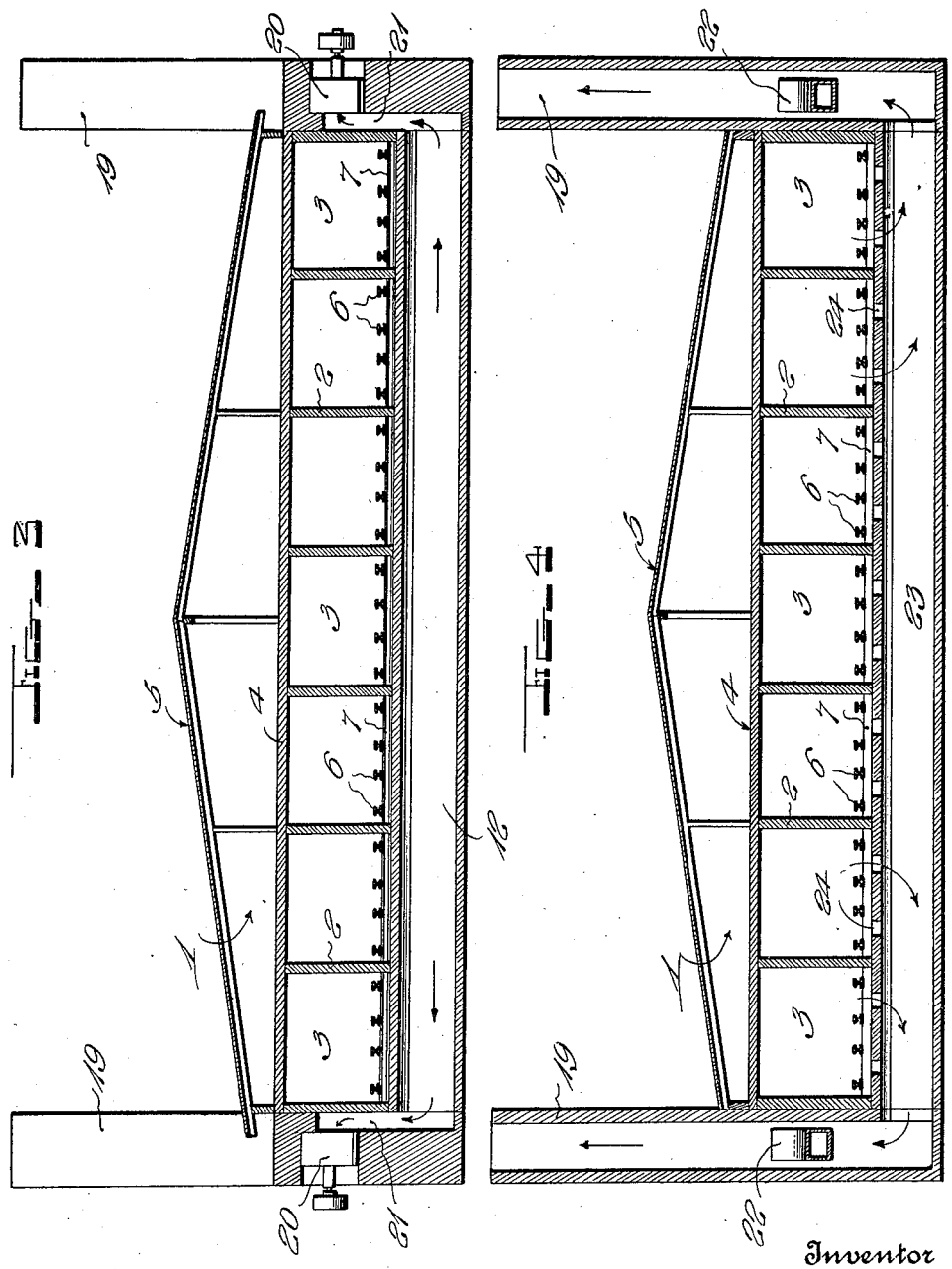

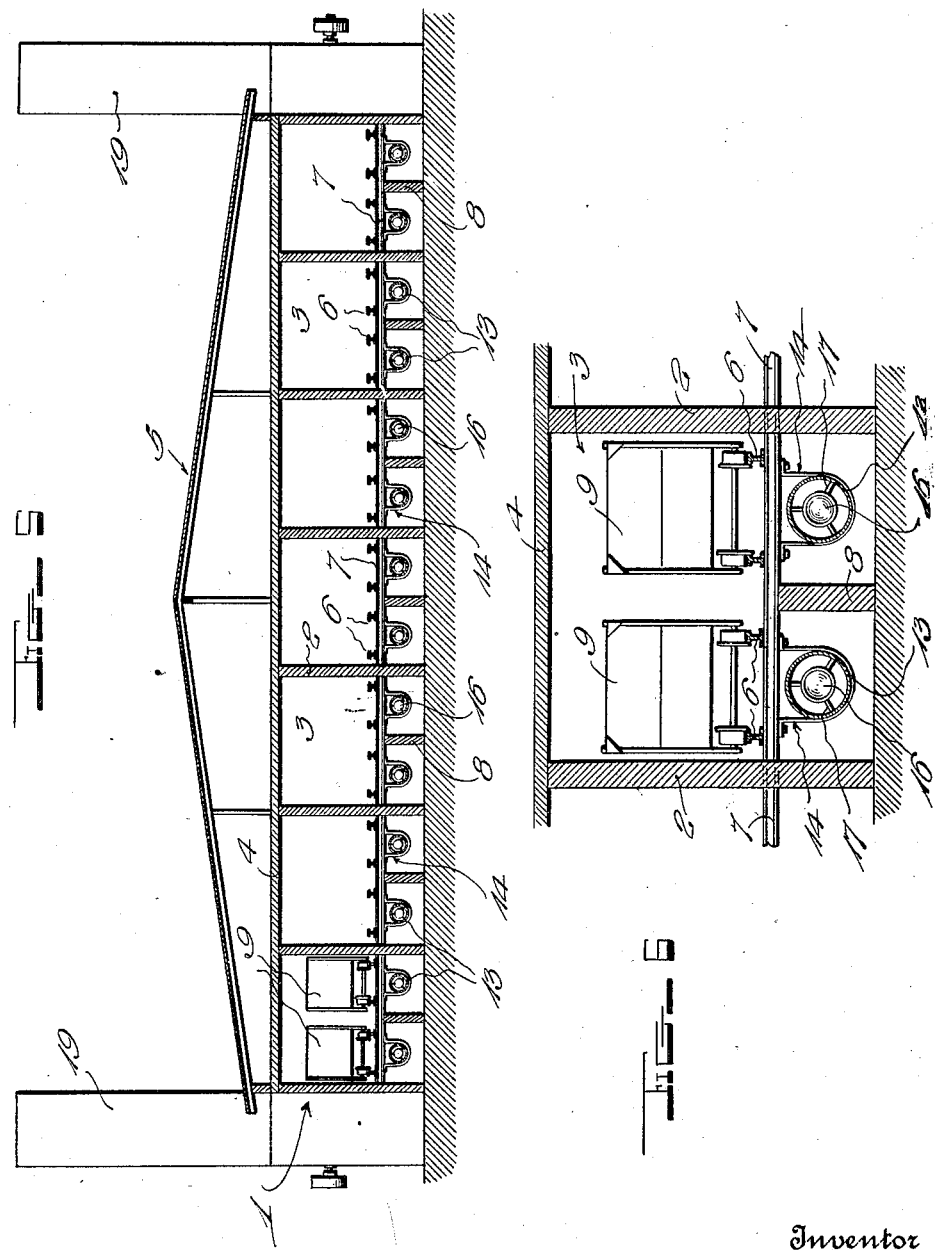

1,499,227

UNITED STATES PATENT OFFICE.

ROBERT THOMPSON KYLE, OF HUNTINGTON, WEST VIRGINIA.

CLAY-PRODUCTS DRIER.

Application filed November 15, 1920, Serial No. 424,280. Renewed January 2, 1924.

*To all whom it may concern:*

Be it known that I, ROBERT T. KYLE, a citizen of the United States, residing at Huntington, in the county of Cabell and State of West Virginia, have invented certain new and useful Improvements in Clay-Products Driers; and I do declare the following to be a full, clear, and exact description of the invention, such as will enable others skilled in the art to which it appertains to make and use the same.

My invention relates to improvements in driers for brick and other clay products, and has for its principal object to provide highly advantageous means for heating the tunnels and drawing off the damp air therefrom as the ware is dried, the arrangement being such as to draw this damp air toward and discharge it from the inlet ends of the tunnels, leaving said tunnels dry and at maximum heat toward their outlet ends.

Another object is to provide for drying the ware by means of pipes or other radiators receiving waste heat from a kiln or the like, and by so doing, even though this waste heat is utilized, the hot gases cannot come in contact with the ware to discolor the same.

A further object is to cause the draft through the stack of the drier to create the necessary suction for exhausting the damp air from the tunnels.

With the foregoing and minor objects in view, the invention resides in the novel construction and arrangement of parts hereinafter described and claimed, the descriptive matter being supplemented by the accompanying drawings which form a part of this application.

Figure 1 is a longitudinal sectional view of a drier constructed in accordance with my invention.

Figure 2 is a horizontal section taken on the plane indicated by line 2—2 of Fig. 1.

Figures 3, 4 and 5 are vertical transverse sectional views as indicated by the lines 3—3, 4—4, and 5—5 of Fig. 1.

Figure 6 is an enlarged detail transverse section looking in the opposite direction from Fig. 5.

Figure 7 is a detail side elevation partly in section, showing more particularly one of the fans used for drawing the waste heat through the radiators and discharging it into the stack.

In the drawings above briefly described, the numeral 1 designates an appropriate building structure, formed of brick or other masonry, or in fact of any adequate materials, said structure being divided by a plurality of longitudinal partitions 2 into separate tunnels 3. At their upper ends, all of these tunnels are closed by an appropriate ceiling structure 4 upon which earth may well be spread as an insulator. Over the ceiling structure, is an appropriate roof 5 whose details of construction are immaterial, as far as the present invention is concerned. In their lower portions, the tunnels 3 are provided with tracks 6 which are supported by appropriate ties 7, which ties may well be supported in part by the partitions 2 and partly by longitudinal supporting walls, such as indicated at 8 in Figs. 5 and 6. The cars 9 containing the green ware to be dried, enter the tunnels 3 at the inlet end I of the drier and after the ware has been dried the necessary amount, the cars are rolled from the outlet end O, both of which ends may be temporarily closed by any preferred means, during the drying process. As usual, suitable sheds 9 are disposed at both ends of the tunnels, and adequate provision may be made within said sheds for handling the cars as they enter and leave the tunnels.

Beneath the outlet ends of the tunnels 3 is a cross flue 10 which is preferably inset in the earth as shown. Hot air and gases may be supplied to this flue through a suitable inlet 11, or through a plurality of such inlets, from a kiln or the like so that the waste heat from the latter may be utilized in operating the drier. However, it will be understood that my invention is not restricted to deriving its heat from this source, since any adequate provision could be made for supplying hot air to the flue 10.

Beneath the inlet ends of the tunnels 3 is a second cross flue 12 and extending from one of these flues to the other, are longitudinal heat radiating pipes 13 or other forms of hot air radiators. When the pipes are used, they are preferably supported by appropriate hangers 14 from the cross ties 7 of the tracks 6, and said pipes are preferably made up of separate sheet metal sections connected by slip-joints such as 15. This construction insures instant radiation of heat from the pipes when hot air and gases are carried therethrough and it will be observed that the slip-joints 15 readily permit the necessary expansion and contraction. To spread the hot air and the like and force it to travel outwardly along the walls of the pipes, cone-shaped spreaders 16 are preferably mounted in said pipes, by means of suitable spiders or the like 17. If desired, each pipe or radiator 13 may be provided with a suitable damper 18 for controlling the passage of hot air, gases or the like therethrough.

At one or both of its ends, the cross flue 12 communicates with stacks, or in some instances, a single stack, and in the present showing, two of these stacks are indicated by the numerals 19. In placing the flue 12 and the stacks 19 in communication with each other, I employ suitable fans 20, passages 21 leading to said fans from the ends of the flue 12, and discharge necks 22 leading from the fans 20 into the flue. This arrangement may be seen most readily in Fig. 7.

Parallel with and in close proximity to the flue 12, is a third cross flue 23 whose ends are in direct communication with the stacks 19, and the crown of said flue 23 is provided with a plurality of air inlet openings 24 which communicate with the lower portions of the tunnels 3 at the inlet ends of the latter. By this arrangement, the draft of air through the stacks 19 creates suction in the cross flue 23 and through the air inlet openings 24 as indicated by the arrow in Fig. 1, the result being that the damp air in the several tunnels 3 is drawn toward the inlet ends of said tunnels and is exhausted from such ends, thereby leaving the tunnels comparatively dry and at maximum heat toward their outlet ends. The ware is thus gradually subjected to increasing heat as it passes through the drier and the accumulation of a great deal of moisture in the tunnels is prevented.

By constructing the drier in or substantially in the manner above set forth, I have provided an extremely efficient device which possesses a great many advantages over other driers which have heretofore been used, particular attention being directed to the following: Waste heat from a kiln or the like may be utilized to advantage in operating the improved drier, yet any gases in such waste heat are not permitted to contact with the ware to discolor the same; the radiators or pipes 13 are of sheet metal and hence radiation of heat therefrom will start as soon as any hot air or gases pass therethrough; these pipes are built up from sections of any suitable length, which sections are connected by slip-joints so that the necessary expansion and contraction is permitted; the usual cross ties which support the tracks are employed to support the pipes 13; the spreaders 16 cause the hot air, gases and the like, to travel in intimate contact with the walls of the pipes and thus the latter produce greater heating efficiency; the exhaust of damp air from the inlet ends of the tunnels 3 prevents the accumulation of a great amount of moisture in said tunnels and leaves the rear portions thereof exceptionally dry and hot to produce maximum drying efficiency on the ware; the draft from the radiators 13 through the flue 12 and the stack or stacks 19 serves to effectively create the necessary suction through the flue 23 and the openings 24; and regardless of the several advantages pointed out, the drier may be constructed as inexpensively as most similar devices now in use.

On account of the several advantageous features above set forth, the construction shown and described, is by preference followed. I wish it understood however that within the scope of the invention as claimed, numerous changes may well be made.

I claim:

1. A drier comprising a tunnel having a ware inlet at one end and a ware outlet at its other end, means for heating said tunnel, and a cross flue under the inlet end of said tunnel leading to the atmosphere, the crown of said cross flue having an air inlet opening communicating with the bottom of said tunnel.

2. A drier comprising a tunnel having a ware inlet at one end and a ware outlet at its other end, a hot air radiator for heating said tunnel, a stack into which said radiator discharges, and a cross flue under the inlet end of said tunnel, said cross flue communicating at one end with said stack and having in its crown an air inlet opening in communication with the inlet end of said tunnel.

3. A drier comprising a tunnel having a ware inlet at one end and a ware outlet at its other end, a hot air radiator for heating said tunnel, a pair of cross flues under the inlet end of said tunnel, one of said flues receiving the discharge from said radiator and the crown of the other flue being provided with an air inlet opening which is in communication with the inlet end of said tunnel, a stack communicating with said other flue, and a fan for drawing the discharge from the radiator out of said one flue and forcing it into said stack.

4. A drier comprising a plurality of tunnels having ware inlets at one end and ware outlets at their other ends, a cross flue under the outlet ends of said tunnels, and a hot air inlet for said cross flue, a second cross flue under the inlet ends of said tunnels, a plurality of heating pipes extending from the first to the second named flue, the space around said pipes being in open communication with said tunnels, a third cross flue adjacent said second flue, the crown of said third flue having openings communicating with the inlet ends of said tunnels, a stack rising from and communicating with said third cross flue, and a fan for drawing air from said second flue and forcing it into said stack.

In testimony whereof I have hereunto set my hand in the presence of two subscribing witnesses.

ROBERT THOMPSON KYLE.

Witnesses:
L. S. DOUTHAT,
WM. MARTIN.